(12) United States Patent
Gomila et al.

(10) Patent No.: US 7,742,655 B2
(45) Date of Patent: *Jun. 22, 2010

(54) METHOD AND APPARATUS FOR REPRESENTING IMAGE GRANULARITY BY ONE OR MORE PARAMETERS

(75) Inventors: Cristina Gomila, Princeton, NJ (US); Alexander Kobilansky, Ossining, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 851 days.

This patent is subject to a terminal disclaimer.

(21) Appl. No.: 10/556,834

(22) PCT Filed: Mar. 30, 2004

(86) PCT No.: PCT/US2004/009866

§ 371 (c)(1),
(2), (4) Date: Nov. 15, 2005

(87) PCT Pub. No.: WO2004/105250

PCT Pub. Date: Dec. 2, 2004

(65) Prior Publication Data

US 2006/0256873 A1 Nov. 16, 2006

Related U.S. Application Data

(60) Provisional application No. 60/470,712, filed on May 15, 2003.

(51) Int. Cl.
G06K 9/40 (2006.01)
G06K 9/36 (2006.01)
(52) U.S. Cl. .................. 382/276; 382/275

(58) Field of Classification Search .............. 382/274, 382/275, 276, 278, 254, 280, 284; 375/240.29, 375/240.18; 348/239, 241, 607, 97
See application file for complete search history.

(56) References Cited

U.S. PATENT DOCUMENTS

| 4,935,816 A | 6/1990 | Faber |
| 5,140,414 A | 8/1992 | Mowry |

(Continued)

FOREIGN PATENT DOCUMENTS

EP 0622000 10/1992

(Continued)

OTHER PUBLICATIONS

Al-Shaykh et al, "Lossy Compression of Images Corrupted by Film Grain Noise," School of Electrical and Computer Engineering, 1996 IEEE.

(Continued)

*Primary Examiner*—Kanji Patel
(74) *Attorney, Agent, or Firm*—Robert D. Shedd; Robert B. Levy

(57) ABSTRACT

To simulate film grain in a compressed video signal, a decoder (15, 28) receives a message containing information that contains a set of one or more parameters, each specifying certain attribute associated with the film grain. For example, one of the parameters will specify the model used to simulate the film grain, whereas other parameters each specify a particular factor associated with that model. Upon receipt of the message, the decoder selects the model, and simulates the film grain for addition to the video signal following decompression.

22 Claims, 3 Drawing Sheets

U.S. PATENT DOCUMENTS

| | | | |
|---|---|---|---|
| 5,335,013 | A | 8/1994 | Faber |
| 5,374,954 | A | 12/1994 | Mowry |
| 5,406,326 | A | 4/1995 | Mowry |
| 5,457,491 | A | 10/1995 | Mowry |
| 5,471,572 | A | 11/1995 | Buchner et al. |
| 5,475,425 | A | 12/1995 | Przyborski et al. |
| 5,629,769 | A | 5/1997 | Cookingham et al. |
| 5,641,596 | A | 6/1997 | Gray et al. |
| 5,687,011 | A | 11/1997 | Mowry |
| 5,709,972 | A | 1/1998 | Cookingham et al. |
| 5,767,860 | A | 6/1998 | Zimmer et al. |
| 5,831,673 | A | 11/1998 | Przyborski et al. |
| 6,067,125 | A * | 5/2000 | May .......................... 348/607 |
| 6,269,180 | B1 | 7/2001 | Sevigny |
| 6,868,190 | B1 * | 3/2005 | Morton ....................... 382/278 |
| 7,092,016 | B2 * | 8/2006 | Morton et al. ............... 348/241 |
| 2002/0034337 | A1 | 3/2002 | Shekter |
| 2003/0063778 | A1 | 4/2003 | Rowe et al. |

FOREIGN PATENT DOCUMENTS

| | | |
|---|---|---|
| EP | 1175091 | 1/2002 |
| EP | 1215624 | 6/2002 |
| EP | 1627359 | 12/2004 |
| JP | 4-97681 | 3/1992 |
| JP | 8-079765 | 3/1996 |
| JP | 10-509297 | 8/1998 |
| WO | WO9314591 | 7/1993 |
| WO | WO9520292 | 7/1995 |
| WO | WO97/10676 | 3/1997 |
| WO | WO9722204 | 6/1997 |
| WO | WO0146992 | 6/2001 |
| WO | WO0177871 | 10/2001 |
| WO | WO 02/22958 A2 | 4/2002 |
| WO | WO2004/105250 | 12/2004 |
| WO | WO2004104931 | 12/2004 |

OTHER PUBLICATIONS

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Peng et al, "Adaptive Frequency Weighting for Fine-Granularity-Scalability," Visual Communications and Image Processing 2002, Proceedings of SPIE, vol. 4671 (2002) SPIE 0277-786X/02, pp. 840-849.

Campisi P. et al. "Signal-dependent film grain noise generation using homorphic adaptive filtering" IEE Processing: Vision Image and Signal Processing, Institution of Electrical Engineers, GB vol. 147 No. 3 (Jun. 23, 2000), pp. 283-287, XP006014574.

Jacky Chun Kit Van et al., Signal-dependent film grain noise removal and generation based on higher-order statistics Higher-Order Statis, 1997 IEE Signal Processing Workshop on BANFF, Alta, Canada 21-23 (Jul. 21, 1997), pp. 77-81, XP010239820.

Search Report dated Jan. 25, 2005.

M. Fischer et al., "Image Sharpening Using Permutation Weighted Medians", Dept. of Electrical European Signal Processing Conference, Tampene, Finland, Apr. 9, 2000, fischer@ee.udel.edu, Article found at: http://cat.inist.fr/?aModele=afficheN&cpsidt=14174950; Nov. 14, 2008.

R. Yan et al., "Efficient Video Coding With Hybrid Spatial and Fine-Grain SNR Scalavbilities", Dept. of Electronic Engineering, Beijing Institute of Technology, Beijing 100081, China; Microsoft Research Asia, #49 Zhichun Road, Haidian, Beijing, 100080, China, Proceedings of SPIE, vol. 4671, pp. 850-859, Jan. 2002; Article found at: http://adsabs.harvard.edu/abs/2002SPIE.4671..850Y, Nov. 14, 2008.

J.C.K. Yan et al., "Film Grain Noise Removal And Generation For Color Images", Department of Electrical and Computer Engineering, University of Toronto, dimitris@comm.toronto.edy, Proceedings of the 1997 IEEE Signal Processing Workshop, 1997, Article found at: http://ieeexplore.ieee.org/application/enterprise/entconfirmation. jsp?arnumber=678146, Nov. 14, 2008.

U.S. Appl. No. 10/569,318, filed Aug. 15, 2008, Office action in related case.

U.S. Appl. No. 10/569,318, filed Feb. 13, 2009, Office action in related case.

U.S. Appl. No. 11/252,177, filed Nov. 5, 2008, Office action in related case.

U.S. Appl. No. 11/252,177, filed Apr. 17, 2009, Office action in related case.

Office Action for U.S. Appl. No. 10/569,318, mailed Aug. 15, 2008.
Office Action for U.S. Appl. No. 10/569,318, mailed Feb. 13, 2009.
Office Action for U.S. Appl. No. 10/569,318, mailed Jul. 31, 2009.
Office Action for U.S. Appl. No. 10/572,820, mailed Jun. 1, 2009.
Office Action for U.S. Appl. No. 10/571,148, mailed Apr. 15, 2009.
Office Action for U.S. Appl. No. 10/575,676, mailed Dec. 15, 2008.
Office Action for U.S. Appl. No. 10/575,676, mailed Mar. 13, 2009.
Office Action for U.S. Appl. No. 11/246,848, mailed Jun. 26, 2009.
Office Action for U.S. Appl. No. 11/252,177, mailed May 29, 2008.
Office Action for U.S. Appl. No. 11/252,177, mailed Nov. 5, 2008.
Office Action for U.S. Appl. No. 11/252,177, mailed Apr. 17, 2009.
Office Action for U.S. Appl. No. 11/252,177, mailed Sep. 18, 2009.
Naderi F. et al : "Estimation of images degraded by film-grain noise"; Applied Optics, vol. 17, Issue 8, pp. 1228-1237 (1978).

* cited by examiner

METHOD AND APPARATUS FOR REPRESENTING IMAGE GRANULARITY BY ONE OR MORE PARAMETERS

CROSS-REFERENCE TO RELATED APPLICATIONS

This application claims the benefit, under 35 U.S.C. §365 of International Application PCT/US2004/009866, filed Mar. 30, 2004, which was published in accordance with PCT Article 21 (2) on Dec. 2, 2004, in English and which claims the benefit of U.S. provisional patent application No. 60/470,712, filed May 15, 2003.

TECHNICAL FIELD

This invention relates to a technique for simulating film grain.

BACKGROUND OF THE INVENTION

Motion picture films comprise silver-halide crystals dispersed in an emulsion, which is coated in thin layers on a film base. The exposure and development of these crystals form the photographic image consisting of discrete tiny particles of silver. In color negatives, where the silver is chemically removed after development, tiny blobs of dye occur on the sites where the silver crystals form. These smalls specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grade is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into natural scene. Cineon® from Eastman Kodak Co, Rochester N.Y., one of the first digital film applications to implement grain simulation, produces very realistic results for many grain types. However, the Cineon® application does not yield good performance for many high speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video restoration. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T/ISO H.264 compression techniques usually result in either an unacceptably low degree of compression or complete loss of the grain texture.

Thus, there exists a need for a technique for representing the film grain characteristics through one or more of a set of parameters.

SUMMARY OF THE INVENTION

Briefly, in accordance with a preferred embodiment of the present principles, there is provided a technique for simulating film grain. The technique commences upon the receipt of image information representative of an image from which film grain has been at least attenuated. Accompanying the image information is film grain information that includes at least one parameter among a set of possible parameters specifying different attributes of the film grain previously in the image. A model is selected for simulating grain and the film grain is simulated film grain in accordance with the selected model and the at least one parameter. The simulated film grain is then merged into the image.

DETAILED DESCRIPTION

Figure 1:
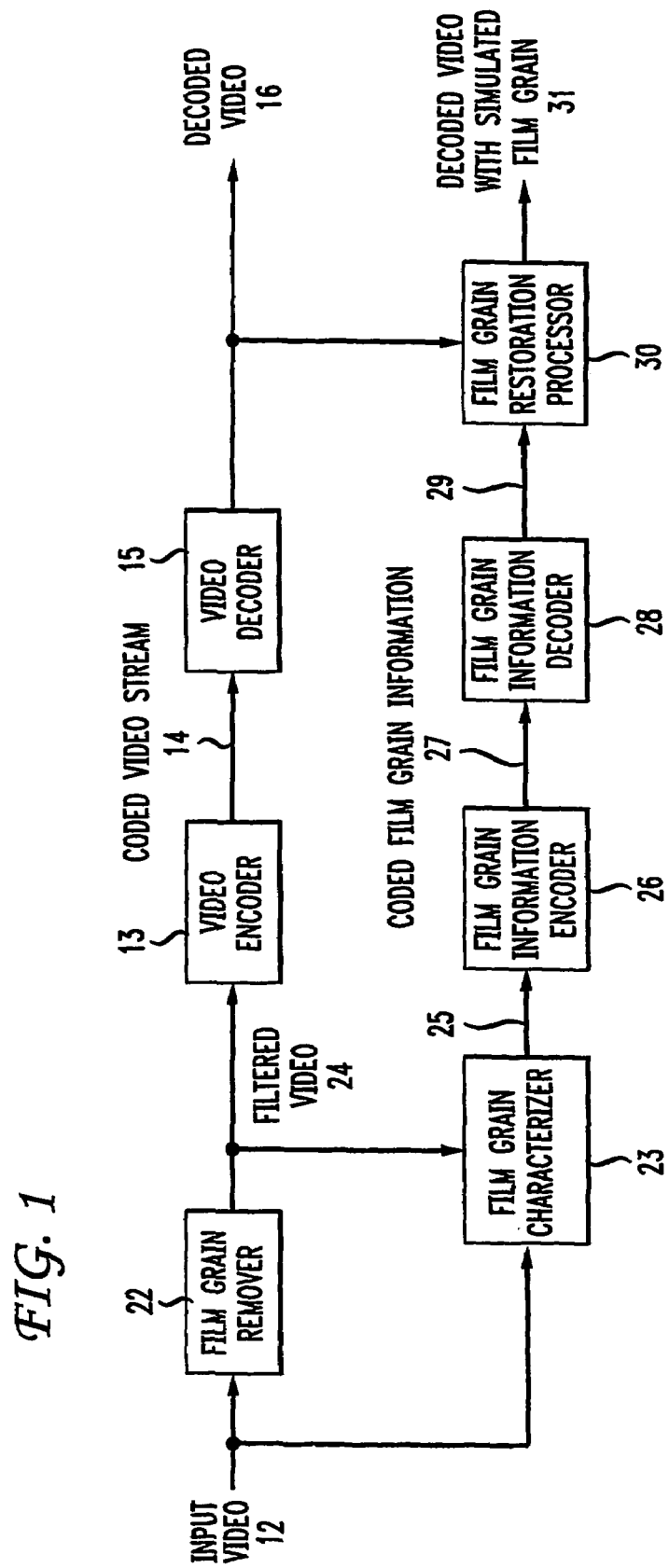
FIG. 1 illustrates a block diagram of a first embodiment of a system in accordance with the present principles for simulating film grain in accordance with the present principles.

FIG. 1 depicts a block schematic diagram of a first embodiment of a system 10 in accordance with the present principles for performing film grain simulation in accordance with the present principles. The system 10 includes a Film Grain Remover 22 that serves to remove the film grain from an input video stream 12 to yield a filtered video stream 24 received at a Video Encoder 13. Film grain removal constitutes a particular case of noise filtering where the noise signal appears correlated with the image signal. Thus, the Film Grain Remover 22 can take the form of a classical image filter, although such a filter will not necessarily provide optimal performance. The Video Encoder 13 encodes the filtered video stream 24 to yield a coded video stream 14 for receipt at a Video Decoder 15 that decodes the coded stream to yield a decoded video stream 16. The Video Encoder 13 and the Video Decoder 15 utilize the same video coding scheme as are well known in the art. For example, the video coding scheme could comprise the ITU-T H.264 video-coding standard, or another type of block-based coding. Encoders and decoders that utilize the MPEG-2 and the ITU-T H.264 standard are well known.

The system 10 also includes a Film Grain Characterizer 23 that receives the input video stream 12 and the filtered video stream 24. From these video streams, the Film Grain Characterizer 23 outputs a message, hereinafter referred to as a grain message, that contains an identity of a model for simulating grain, as well at least one of a set of several parameters, including correlation parameters, intensity-independent parameters and intensity-dependent parameters used by the identified model. As discussed in detail below, the parameters in the film grain message enable simulation of the original image-dependent noise using the identified model. In the absence of any of the parameters, a default value is assigned to that missing parameter. (Indeed, if no model is identified, a default model for film grain is assumed. In one embodiment, the Film grain characterizer 23 generates the parameters in accordance with a model based on the physical process of exposure and development of the photographic film or upon processes added during the subsequent editing of the images.

Following generation of the grain message, a Film Grain characterization information Encoder 26 encodes the message for transmission to a Film Grain characterization information Decoder 28 in-band or out-of band from, the encoded video stream 14 transmitted by the Video Encoder 13 to a the Video Decoder 15. Both the Video Encoder 13 and the Film Grain characterization information Encoder 26 use the same encoding scheme. Thus, for example, when the Encoder 26 utilizes the ITU-T H.264 video-coding standard for encoding, the coded film grain characterization information stream 27 can take the form of the film grain Supplemental Enhancement Information (SEI) message as defined in the ITU-T H.264 video coding standard.

The Film Grain characterization information Decoder 28 decodes the coded film grain message 27 to yield a decoded film grain characterization information stream 29 for input to a Film Grain Restoration Processor 30. As described in detail hereinafter, the Processor 30 will simulate the film grain with a model identified in the grain message using parameters in message. In the absence of the identification of the model, the Processor 30 will assume a default mode. Likewise, in the absence of a specified value of a given parameter, the Processor 30 will assume a default value for that parameter.

In a preferred embodiment, the grain message 25 of FIG. 1 will typically include one or more correlation parameters specifying Spatial Correlation, Aspect Ratio, Color Correlation, and Temporal Correlation. Each of these parameters is discussed below Spatial Correlation In an exemplary embodiment, the image-dependent correlation of the film grain in the spatial domain can be modeled with at least one parameter, Spatial Correlation. The measured spatial correlation determines the size of the blobs. A second order auto regression model and a convolution model for the Spatial Correlation are described hereinafter.

Aspect Ratio

Ideally, film grain should appear isotropic, with identical characteristics both in X and Y direction. However, in practice, the film grain actually can appear stretched in one direction, often resulting from factors related to film recording, such as the use anamorphic optics or non-square detector geometry. For that reason, when modeling film grain, an intensity-independent parameter representing the aspect ratio factor will complement the spatial correlation measure. The aspect ratio of the grain blobs is specified with at least one parameter.

Color Correlation

In accordance with the present principles, the layer-dependency of the film grain in color images is represented using color correlation. The measured color correlation determines the perceived tint of the grain. A weak color correlation implies that grain blobs created in the different color layers randomly overlay each other. Consequently, a viewer will perceive the grain as colored. A high color correlation implies that the grain blobs on one color component depend on other color components. In this case, a viewer will perceive the grain as monochromatic.

Temporal Correlation

The temporal correlation of the grain in sequences is represented by at least one parameter. Grain by itself cannot exhibit any temporal correlation between frames, but the introduction of a parameter representing temporal correlation can help to simulate other observed effects caused by the editing of the film.

Noise Intensity

In conjunction with the previously discussed parameters representing the dependency of the film grain with the film image, a need exists to represent the intensity of the noise arising from the random processes that originate the film grain. Noise intensity can vary for each color component and will depend on the film image. The intensity of the grain determines the level in which noise is perceived in the image. Small grain intensity levels introduce small variations in the original image and hardly appear noticeable. High intensity levels become clearly visible as peaks superimposed in the image.

Other Parameters

In addition to the parameters discussed above, the grain message can also include parameters that identify the color space in which to add the film grain, and the blending mode used to blend the grain with the video signal. Note that a different set of parameters could be transmitted for each color component and for different intensity levels of the film image. It is well known for example that film grain depends on the local intensity of the image, and that different color components can have different grain depending on the type of film stock.

The film grain characterizer 23 of FIG. 1 can generate different sets of parameters in accordance with the intensity levels of the image. If desired, the Film grain decoder 28 can interpolate the set of parameters to various intensity levels in order to derive a smooth transition of the film grain characteristics.

In order to interpret the set of parameters, the Film grain decoder 28 must have a specification of the model that generates the parameters. To understand how such a model can be specified, the following mathematical relationships will prove useful. First, the decoded image pixel value at image position (x, y), color channel c, and frame number t is represented by I(x, y, c, t). For convenience, assume that pixel values are scaled to have maximum value of one. Further, assume an RGB image representation (c=1, 2, or 3), although this model can be directly to monochromatic images and, with obvious modifications, to YUV representation.

With an additive grain model, grain simulation changes each pixel value to J(x, y, c, t) where J(x, y, c, t) is given by the relationship:

$$J(x, y, c, t)=I(x, y, c, t)+G(x, y, c, t, L(x, y, t)), \quad (1)$$

where L(x, y, t) is a measure of local intensity in the image and G(x, y, c, t, L(x, y, t)) defines the grain value. One possible implementation is to define L as luminance, or a weighted sum of intensities I(x, y, c, t) over all color channels.

The additive model given by equation (1) is appropriate when a logarithmic intensity scale is used. For linear scale, the model of equation (1) can be replaced by the following multiplicative mode:

$$J(x, y, c, t)=I(x, y, c, t)*(1+G(x, y, c, t, L(x, y, t))). \quad (1a)$$

Whether an additive or a multiplicative grain model is implemented will depend on the format of the decoded image. In general, grain should comprise small fraction of maximum pixel value. The following describes some examples of different kind of models for extracting a set of parameters in accordance with the present invention.

1. Autoregressive Simulation of Film Grain Pattern

In an exemplary embodiment, a second order auto regression scheme can be used to model spatial correlation and a first order regression scheme can be used to model cross-color and temporal correlations. All correlation factors depend on intensity of the decoded image. Horizontal and vertical spatial correlation factors are related by a constant aspect ratio factor. Under such conditions, the following formula will yield simulated grain values, $$G(x, y, c, t, L)=p(c, L)*N+q(c, L)*(G(x-1, y, c, t, L)+A*G(x, y-1, c, t, L))+r(c, L)*A*(G(x-1, y-1, c, t, L)+G(x+1, y-1, c, t, L))+s(c, L)*(G(x-2, y, c, t, L)+A*A*G(x, y-2, c, t, L))+u(c, L)*G(x, y, c-1, t, L)+v(c, L)*G(x, y, c, t-1, L) \quad (2)$$

where N is a random value with normalized Gaussian distribution, A is a constant pixel aspect ratio, p, q, r, s, u, and v are correlation parameters. Parameter u is always zero for the first color channel, and the grain value G assumed to be zero whenever any index is out of range.

As can be seen from the structure of equation (2), grain values for a given pixel in a given color channel are calculated recursively using previously calculated grain values. Specifically, frames are calculated in order of increasing frame number (i.e., increasing t). Within each frame, color channels processing occurs in order of increasing color channel number (i.e., increasing c). Within each color channel, pixels are rasterized horizontally and then vertically in order of increasing x and y. When this order is followed, all grain values required by equation (2) are automatically calculated in advance.

Under certain circumstances, vertical rasterization proves more practical, i.e. pixels processing occurs by columns first. In such cases, equation (2) will require a slight modification to use only previously calculated values:

$$G(x, y, c, t, L)=p(c, L)*N+q(c, L)*(G(x-1, y, c, t, L)+A*G(x, y-1, c, t, L))+r(c, L)*A*(G(x-1, y-1, c, t, L)+G(x-1, y+1, c, t, L))+s(c, L)*(G(x-2, y, c, t, L)+A*A*G(x, y-2, c, t, L))+u(c, L)*G(x, y, c-1, t, L)+v(c, L)*G(x, y, c, t-1, L). \quad (2a)$$

Implementing equation (2) or equation (2a)) requires certain minimum decoder capabilities. First, the Film Grain Information decoder 28 must perform all calculations real time. Second, the Film Grain Information decoder 28 needs to keep a number of previously calculated grain values in memory. Specifically, to implement temporal correlation (i.e., last term in equations (2) and (2a)), the Film Grain Information decoder 28 needs to keep grain values for a full previous frame. From this perspective, it is important that the model of equation (2) allow gradual scaling down requirements with some degradation of fidelity.

A system with slightly lower fidelity could ignore the last (temporal) term in equation (2). Doing so would eliminate the need to have an additional frame buffer to keep grain values from previous frame. Further cost savings would result by neglecting those terms in equation (2) that depend on s(c, L). Doing so eliminates need to store a second previous row in memory and reduces number of calculations. Neglecting diagonal correlations described by terms with r(c, L), and so on will achieve a further reduction of complexity. The lowest quality grain simulator will use only white noise term.

Whenever a term is neglected in a scaled-down system, a benefit occurs if the Film Grain Information decoder 28 adjusts the remaining parameters so that the effective first-order correlation and even more importantly, the autocorrelation (noise power) remain the same as they would in a full-scale implementation of the model embodied by equation (2). The same adjustment should occur for the first rows and columns of each frame in the absence of the availability of all of the previous grain values.

The flexibility of the model embodied in equation (2) will become further apparent by setting parameters p, q, r, and s to zero for all but first color channel, and by setting the color correlations u(c, L) for c>1 to 1. Under such conditions, the grain becomes completely monochromatic. This set of parameters values can describe the case for color variations washed out by previous YUV 4:2:0 transformation of the color space.

For a set of three colors, the model of equation (2) describes the grain pattern in terms of a group of seventeen parameters for each luminance level, plus an aspect ratio that does not depend on luminance. Luminance-dependent parameters can be encoded for several fixed luminance levels. The decoder will interpolate parameters values for intermediate luminance levels.

Grain parameters do not have to be represented exactly in the form of equation (2). For example, any one-to-one transform of the parameters could be used. In addition, different set of reference intensity levels could be used for different parameters and different interpolation schemes could be used, etc.

2. Convolution in the spatial domain to simulate the film grain pattern

In another exemplary embodiment, the film grain pattern can be simulated by convolving a set of random numbers x by a linear, time-invariant, digital-filter h defined in the form:

$$h=(h_0, h_1, h_2, h_3, \ldots h_n) \quad (3)$$

This states that the filter output simulating film grain y(n) is the convolution of the input x(n) with the filter impulse response h(n):

$$y(n) = \sum_{i=0}^{n} x(i)h(n-i) = (x*h)(n) \quad (4)$$

Although equation (4) yields a simulation in one dimension, a two-dimensional pattern could be obtained by concatenating the vertical and horizontal convolutions in one dimension. Under such circumstances, the coefficients of the filter should be transmitted in addition to the aspect ratio factor.

A Film Grain Information decoder 28 with limited capabilities can limit the spatial size of the convolution kernel, which will result in decreased memory and processing power requirements.

3. Filtering in a transformed domain to simulate the film grain pattern

As discussed previously, convolving the impulse response of a filter h with a set of random numbers x can characterize the film grain pattern. This same operation can also be described by multiplication in the frequency domain by the Fourier Transform of the impulse response H and the Fourier Transform of the set of random numbers X:

$$Y(u)=X(u) \cdot H(u) \quad (5)$$

Filtering in the frequency domain affords an advantage because it is computationally faster if a Fourier transform of the image is available for example as part of filtering or compression process."

The following set of parameters yielded satisfactory results to represent image-dependent grain according in accordance with the present principles. These parameters assume an autoregressive method of simulating grain. Parameters for other methods would be represented by similar tables.

Color space: logarithmic RGB
Blending mode: additive
Aspect ratio: 1
Number of intensity levels: 3

Parameters for the R Component:

|  | q | r | u | v | p |
|---|---|---|---|---|---|
| level [0, 84]: | 0.1 | .01 | 0.0 | 0.2 | 0.02 |
| level [85, 168]: | 0.1 | .01 | 0.0 | 0.15 | 0.03 |
| level [169, 255]: | 0.3 | −.01 | 0.0 | 0.15 | 0.05 |

Parameters for the G Component:

|  | q | r | u | v | p |
|---|---|---|---|---|---|
| level [0, 84]: | 0.3 | 0.0 | 0.1 | 0.2 | 0.01 |
| level [85, 168]: | 0.2 | .01 | 0.1 | 0.15 | 0.03 |
| level [169, 255]: | 0.1 | −.01 | 0.2 | 0.1 | 0.05 |

Parameters for the B Component:

|  | q | r | u | v | p |
|---|---|---|---|---|---|
| level [0, 84]: | 0.4 | .01 | 0.1 | 0.2 | 0.02 |
| level [85, 168]: | 0.1 | 0.0 | 0.1 | 0.15 | 0.03 |
| level [169, 255]: | 0.1 | 0.0 | 0.2 | 0.1 | 0.04 |

Correlation parameters not shown in this table are set to 0.

After specifying the color space, the blending mode, the aspect ratio and the number of intensity levels for which different parameters are defined, the film grain on each color component is encoded. Note that only the data in italics in addition to some level (intensity) information has to be transmitted.

Figure 2:
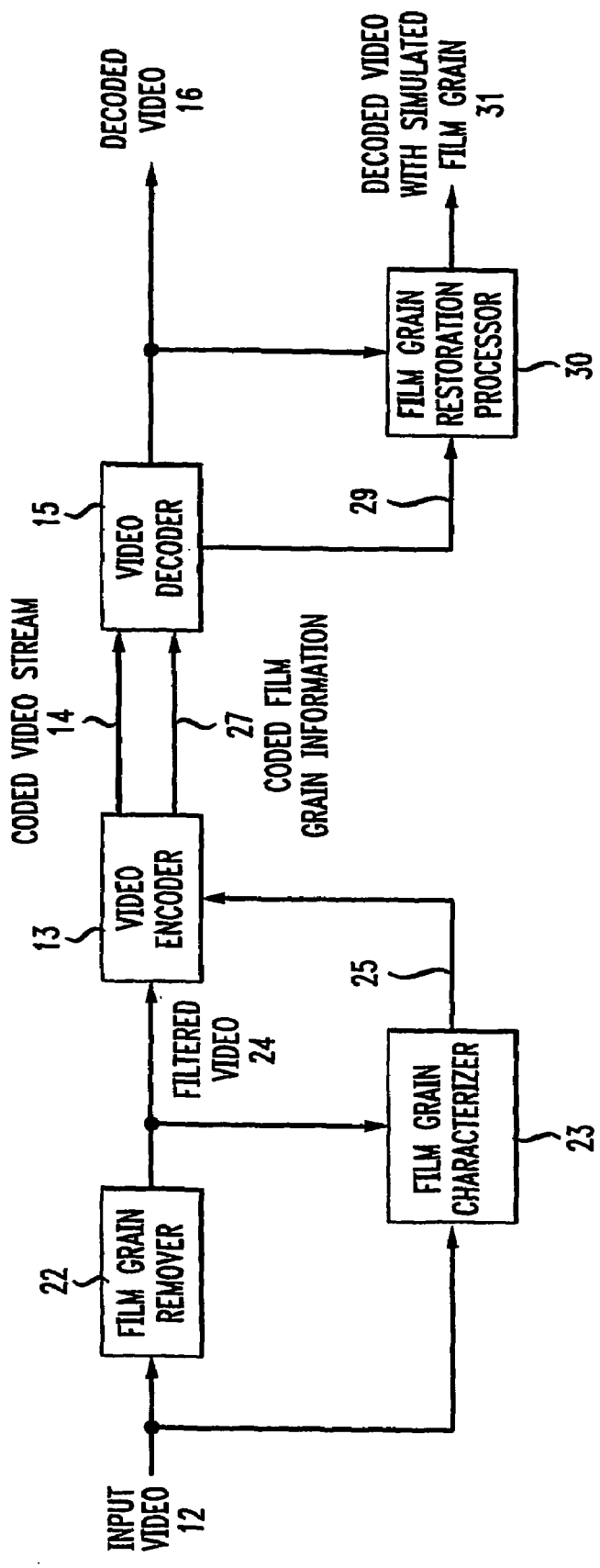
FIG. 2 illustrates a block diagram of a second embodiment of a system in accordance with the present principles for simulating film grain in accordance with the present principles.

FIG. 2 depicts a second embodiment 10' of a system for simulating film grain in accordance with the present principles. The system 10' shares many of the same elements as the system 10 of FIG. 1 and like reference numbers describe like elements. Indeed, the system 10' of FIG. 2 differs only in the absence of the Film Grain characterization information Encoder 26 and Film Grain characterization information Decoder 28 of FIG. 1. The system 10' of FIG. 2 uses the Video Encoder 13 and Video Decoder 15 to encode and decode respectively the film grain characterization information 25 output of the Film Grain Characterizer 23. The system 10' of FIG. 2 requires the use of a video coding standard that supports the transmission film grain characterization information as parallel enhancement information.

Figure 3:
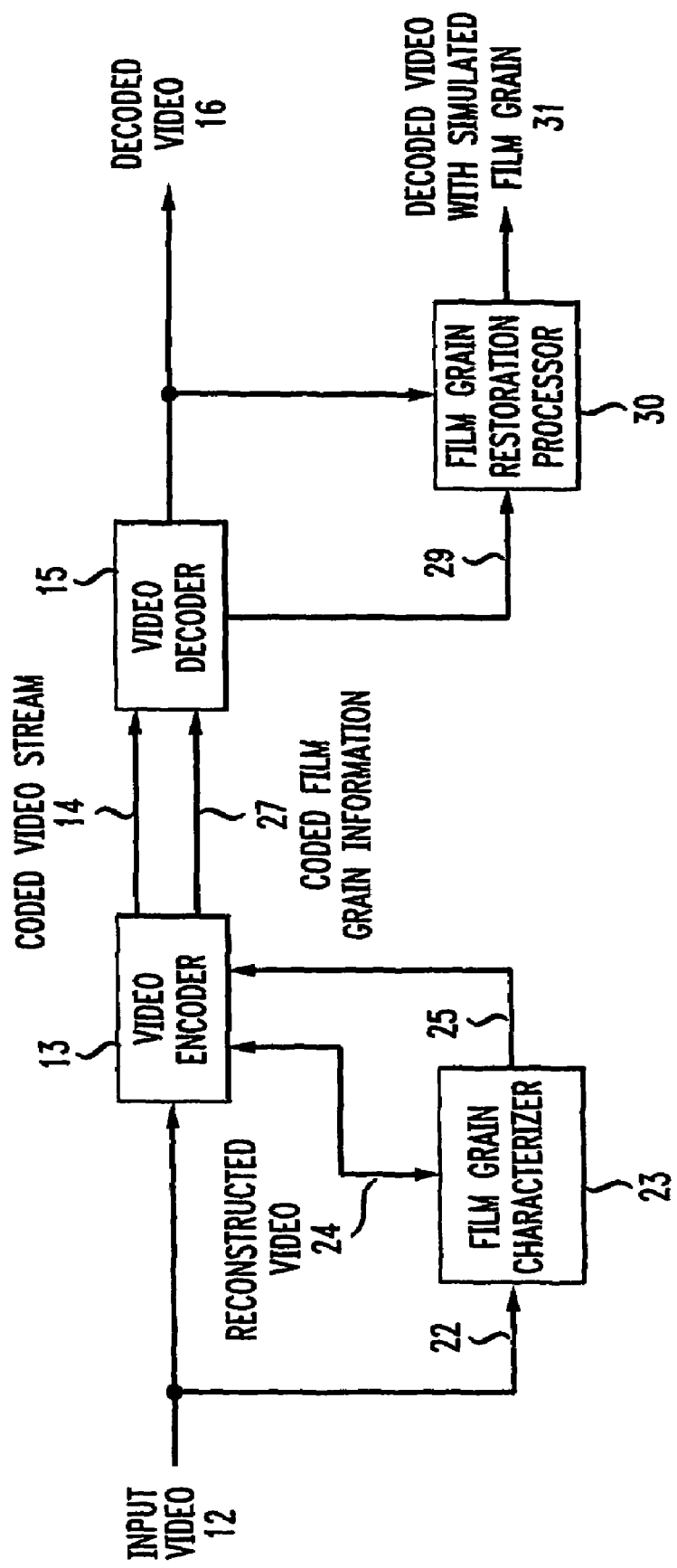
FIG. 3 illustrates a block diagram of a third embodiment of a system in accordance with the present principles for simulating film grain in accordance with the present principles.

FIG. 3 depicts a third embodiment 10" of a system for simulating film grain in accordance with the present principles. The system 10" shares many of the same elements as the system 10' of FIG. 2 and like reference numbers describe like elements. Indeed, the system 10" of FIG. 3 differs only in the absence of the Film Grain Remover 22 of FIG. 2. The system 10" of FIG. 3 uses the reconstructed images available at the Video Encoder 13 to simulate the result of removing film grain. The system 10" of FIG. 3 affords two advantages as compared to the systems 10 of FIG. 1 and 10' of FIG. 2. First, the system 10" of FIG. 3 reduces the computational complexity related to film grain removal, and secondly, it adapts the film grain characterization to the amount of film grain suppressed by the Video Encoder 13. Once the Film Grain Characterizer of FIG. 3 disposes of both the input video 12 with film grain, and a reconstructed video 24 resulting from Video Encoder 13, it can accomplish the task of characterizing the observed film grain.

The foregoing describes a technique for simulating film grain in a video signal. While the film grain simulation technique has been described in connection with the encoding and decoding of a video signal, the technique has equal applicability for other purposes, such as for example post-production of motion picture films for example. In this regard, the original image could exist as image information in a form other than a compressed video signal, and the film grain information could exist in a form other than as a message, such as an SEI message. For example, the image information could exist in one of a variety of different formats that exist in the art.

The invention claimed is:

1. A method for simulating film grain comprising the steps of:
   receiving image information representative of an image from which film grain has been at least attenuated;
   receiving film grain information that includes at least one parameter among a set of possible parameters specifying different attributes of the film grain previously in the image;
   selecting a model for simulating grain;
   simulating the film grain in accordance with the selected model and the at least one parameter; and
   merging the simulated film grain into the image.

2. The method according to claim 1 wherein the set of parameters includes a plurality of correlation parameters and a plurality of intensity-independent parameters.

3. The method according to claim 2 wherein at least one correlation parameter defines a spatial correlation in a perceived pattern of film grain.

4. The method according to claim 2 wherein at least one correlation parameter defines a correlation between color layers.

5. The method according to claim 2 wherein at least one correlation parameter defines a temporal correlation resulting from previous processing the image sequence.

6. The method according to claim 2 wherein at least one intensity-independent parameters defines an aspect ratio of the film grain.

7. The method according to claim 1 wherein at least one parameter defines intensity of a random component of the film grain.

8. The method according to claim 2 wherein at least one of the intensity-independent parameters defines a color space and blending mode operation used to merge the simulated film grain with the image.

9. The method according to claim 1 wherein the message containing the film grain information is transmitted out-of band with the image representative information.

10. The method according to claim 1 wherein the message containing the film grain information is transmitted in band with the image representative information.

11. The method in accordance with claim 2 where the set of parameters are computed in accordance with a second order auto regression representation of the spatial correlation and a first order regression representation of the cross-color and temporal correlations.

12. The method according to claim 3 wherein the at least one parameter describing the spatial pattern of the grain is established in accordance with a spatial convolution model.

13. The method according to claim 3 wherein the at least one parameter describing the spatial pattern of the grain is obtained from cut frequencies of a filter in the Fourier domain.

14. The method according to claim 1 wherein the set of selecting the model further comprises the step of selecting an additive grain model.

15. The method according to claim 1 wherein the set of selecting the model further comprises the step of selecting a multiplicative grain model.

16. The method according to claim 1 wherein the step of selecting the model further comprises the step of selecting a model that simulates the film grain by convolving a set of random numbers by a linear, time-invariant, digital-filter h defined in the form of:

$$h=(h_0, h_1, h_2, h_3, \ldots h_n)$$

wherein the set of parameters includes filter coefficients.

17. The method according to claim 1 wherein the step of selecting the model further comprises the step of multiplying in the frequency domain by a Fourier Transform of an impulse response H and a Fourier Transform set of random numbers to yield a simulated grain result Y(u) in accordance with the relationship $$Y(u)=X(u)\cdot H(u)$$

18. Apparatus for simulating film grain, comprising:
first means for: (1) receiving image information representing an image from which film grain has been substantially attenuated; (2) receiving film grain information that includes at least one parameter among a set of possible parameters specifying different attributes of the film grain; (3) selecting a model for simulating grain; and (4) simulating the film grain in accordance with the selected model and the at least one parameter; and
second means for merging the simulated film grain with the image.

19. The apparatus according to claim 18 wherein the model selected by the first means comprises an additive grain model.

20. The apparatus according to claim 18 wherein the model selected by the first means comprises a multiplicative grain model.

21. The apparatus according to claim 18 wherein the model selected by the first means simulates the film grain by convolving a set of random numbers x by a linear, time-invariant, digital-filter h defined in the form of:

$$h=(h_0, h_1, h_2, h_3, \ldots h_n)$$

wherein the set of parameters includes filter coefficients.

22. The apparatus according to claim 18 wherein the model selected by the first means simulates film grain by multiplying in the frequency domain by a Fourier Transform of an impulse response H and a Fourier Transform set of random numbers to yield a simulated grain result Y(u) in accordance with the relationship:

$$Y(u)=X(u)\cdot H(u).$$

* * * * *